United States Patent [19]
Parton

[11] 4,167,509
[45] Sep. 11, 1979

[54] WATER SOLUBLE CATIONIC AZO DYESTUFFS

[75] Inventor: Brian Parton, Manchester, England

[73] Assignee: Imperial Chemical Industries Limited, London, England

[21] Appl. No.: 745,777

[22] Filed: Nov. 29, 1976

[30] Foreign Application Priority Data

Dec. 17, 1975 [GB] United Kingdom ............... 51618/75

[51] Int. Cl.$^2$ .................. C09B 29/36; C09B 31/14; C09B 35/26; C09B 43/00
[52] U.S. Cl. .............................. 260/156; 260/146 R; 260/146 D; 260/154; 260/193; 260/155; 544/131; 544/364
[58] Field of Search ........................... 260/156, 146 R

[56] References Cited
U.S. PATENT DOCUMENTS

| | | | |
|---|---|---|---|
| 3,487,066 | 12/1969 | Ritter et al. .......................... | 260/156 |
| 3,852,261 | 12/1974 | Steinemann ......................... | 260/156 |

FOREIGN PATENT DOCUMENTS

| | | | |
|---|---|---|---|
| 2252943 | 5/1974 | Fed. Rep. of Germany .......... | 260/156 |
| 1360749 | 7/1974 | United Kingdom ................... | 260/156 |
| 1377612 | 12/1974 | United Kingdom ................... | 260/156 |

*Primary Examiner*—Charles F. Warren
*Attorney, Agent, or Firm*—Cushman, Darby & Cushman

[57] ABSTRACT

Azo dyestuffs devoid of carboxylic acid and sulphonic acid groups and of the formula (I)

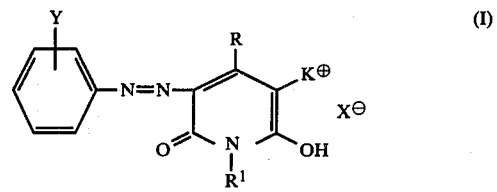

wherein R is a hydrogen atom, halogen atom, cyano, nitro, hydroxy or amino group or an organic radical, $R^1$ is a hydrogen atom, an optionally substituted hydrocarbon or heterocyclic radical or an amino group which may be substituted, Y is a group —$COR^2$ or

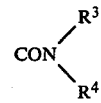

wherein $R^2$ is an alkyl group having two or more carbon atoms, $R^3$ is an alkyl group of more than three carbon atoms or an aralkyl group and $R^4$ is hydrogen or an optionally substituted alkyl or aryl group, $K^+$ is a cationic group, $X^-$ is an anion and the ring A may carry further substituents or have a benz ring fused thereon. Process for manufacture of the dyestuffs and their use for the coloration of synthetic polymers, in particular polyacrylonitrile and copolymers thereof.

2 Claims, No Drawings

WATER SOLUBLE CATIONIC AZO DYESTUFFS

This invention relates to new water-soluble azo dyestuffs, to their manufacture and to the use of such dyestuffs for the colouration of synthetic polymeric materials in the form of ribbons, tapes, fibres, films, threads and textile materials generally. The dyestuffs are particularly valuable for the colouration of polymers and copolymers of acrylonitrile and of dicyanoethylene and also acid-modified polyesters and polyamides.

According to the present invention there are provided azo dyestuffs devoid of carboxylic acid and sulphonic acid groups and of the formula (I)

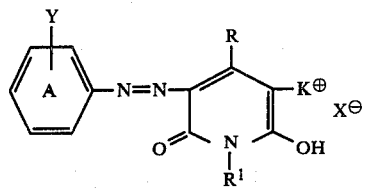
(I)

wherein R is a hydrogen atom, halogen atom, cyano, nitro, hydroxy or amino group or an organic radical, $R^1$ is a hydrogen atom, an optionally substituted hydrocarbon or heterocyclic radical or an amino group which may be substituted, Y is a group $-COR^2$ or

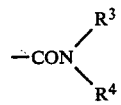

wherein $R^2$ is an alkyl group having two or more carbon atoms, $R^3$ is an alkyl group of more than three carbon atoms or an aralkyl group and $R^4$ is hydrogen or an optionally substituted alkyl or aryl group, $K^+$ is a cationic group, $X^-$ is an anion and the ring A may carry further substituents or have a benz ring fused thereon.

The azo dyestuffs of the invention can exist in a number of tautomeric forms; for convenience the dyestuffs have only been formulated in one of these tautomeric forms, but it is to be understood that this invention includes within its scope the dyestuffs in any of the possible tautomeric forms.

R may be a hydrogen atom, halogen atom, cyano, nitro, hydroxy or amino group or an organic radical, examples of such organic radicals including optionally substituted alkyl, aryl, aralkyl, cycloalkyl and heterocyclic radicals, carboxylic acid ester and carboxylic acid amide, substituted amino and hyrocarbyloxy groups.

Specific examples of R include methyl, ethyl, n-propyl, n-butyl, β-hydroxyethyl, β-methoxy (or ethoxy)-ethyl, β-cyanoethyl, carbethoxymethyl, acetylmethyl, phenyl, chlorophenyl, methoxyphenyl, benzyl, phenylethyl, cyclohexyl, 2-pyridyl, 2-thiazolyl, 1-piperidyl, 2-morpholinyl, methoxycarbonyl, ethoxycarbonyl, carbamyl, N,N′-dimethylcarbamyl, N,N′-diethylcarbonamido, chloro, cyano, nitro, amino, hydroxy, bromo, methoxy, ethoxy, diethylamino, N-methyl-benzylamino, N-methylanilino, anilino, methoxycarbonylmethyl, methylsulphonylmethyl, anilinocarbonylmethyl, cyanomethyl, N,N-dimethylaminocarbonylmethyl, N-nonylcarbamyl, nonyloxycarbonyl, N-phenylcarbamyl, N-benzylcarbamyl, N,N-dibenzylcarbamyl, 2-furyl, 2-thienyl, 2-pyrryl and phenoxymethyl.

R is preferably lower alkyl especially methyl.

$R^1$ may be a hydrogen atom, an optionally substituted hydrocarbon or heterocyclic radical or an amino group which may be substituted.

Specific examples of $R^1$ include methyl, ethyl, n-propyl, n-butyl, β-hydroxyethyl, β-methoxy (or ethoxy)-ethyl, β-cyanoethyl, carbethoxymethyl, γ-methoxypropyl, acetylmethyl, phenyl, tolyl, chlorophenyl, methoxyphenyl, benzyl, phenylethyl, cyclohexyl, 2-pyridyl, 2-thiazolyl, 1-piperidyl, 1-morpholinyl, dimethylamino, 2-ethylhexyl, nonyl, dodecyl, p-butylphenyl and p-dodecylphenyl.

Y may be a group of the formula $-COR^2$ or

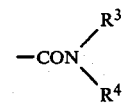

wherein $R^2$ is an alkyl group having two or more carbon atoms $R^3$ is an alkyl group of more than three carbon atoms or an alkaryl group and $R^4$ is hydrogen or an optionally substituted alkyl or aryl group.

Examples of Y where Y is $-COR^2$ include those groups wherein $R^2$ is ethyl, propyl, butyl, pentyl, heptyl, nonyl, hexadecyl, pentadecyl and heptadecyl. $R^2$ may be straight chain or branched isomers of the above examples, although straight chain isomers are preferred.

Examples of Y where Y is

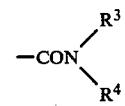

include those groups wherein $R^3$ is butyl, pentyl, hexyl, octyl, decyl and dodecyl all of which may be straight chain or branched, benzyl and phenylethyl and $R^4$ is hydrogen, methyl, ethyl, propyl, butyl, β-hydroxy ethyl, β-cyanoethyl, α-chloro-β-hydroxyethyl and phenyl.

The group Y is preferably in the para position relative to the azo group.

Preferably the group Y contains as one of the groups $R^2$, $R^3$ or $R^4$ a hydrocarbyl group of more than 5 carbon atoms, particularly an alkyl group of 6 to 16 carbon atoms.

As examples of cationic groups which are represented by $K^+$ are included quaternary ammonium, cycloammonium, hydrazinium, sulphonium, isothiouronium, etherified hydroxylammonium and phosphonium groups which may be associated with any anion $X^-$.

As quaternary ammonium groups are meant groups of the formula

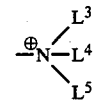

wherein $L^3$, $L^4$ and $L^5$ represent optionally substituted alkyl or cycloalkyl groups or one may be a phenyl group or wherein $L^4$ and $L^5$ taken together with the nitrogen atom form a 5 or 6 membered ring.

As optionally substituted alkyl groups $L^3$, $L^4$ and $L^5$ there may be mentioned methyl, ethyl, benzyl, cyclohexyl, β-hydroxyethyl.

As 5 or 6 membered rings which may be formed from L⁴ and L⁵ together with the nitrogen atom there may be mentioned piperidine and morpholine (as in piperidinium and morpholinium salts), in this case the group L³ is optionally substituted alkyl or cycloalkyl. These latter can also be described as cyclammonium groups. As cyclammonium groups there are meant heterocyclic systems containing in the ring a quaternised nitrogen atom which is preferably the point of attachment of the ring to the remainder of the molecule, for example N-methylpiperidinium and N-methylmorpholinium, but more particularly aromatic heterocyclic quaternary systems such as pyridinium, α-picolinium, β-picolinium, γ-picolinium, quinolinium, isoquinolinium, and including heterocyclic systems containing heteroatoms additional to the quaternised nitrogen atom and substituted derivatives of the foregoing.

As sulphonium groups there are meant groups of the formula

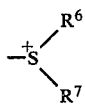

wherein $R^6$ stands for an alkyl or substituted alkyl radical such as methyl or ethyl, $R^7$ stands for an alkyl or substituted alkyl radical such as methyl, ethyl, and δ-hydroxyethyl, a cycloalkyl radical such as cyclohexyl, an aralkyl radical such as benzyl and an aryl radical such as phenyl and p-tolyl.

As isothiouronium groups there are meant groups which is one of their resonating forms may be represented by the formula

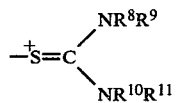

wherein $R^8$, $R^9$, $R^{10}$ and $R^{11}$ represent hydrogen atoms or hydrocarbon or substituted hydrocarbon radicals or $R^8$ and $R^{10}$ may together form an alkylene radical.

As examples of hydrocarbon and substituted hydrocarbon radicals which may be represented by $R^8$, $R^9$, $R^{10}$ and $R^{11}$ there may be mentioned alkyl radicals such as methyl and ethyl, substituted alkyl radicals such as β-hydroxyethyl, cycloalkyl radicals such as cyclohexyl, aralkyl radicals such as benzyl and aryl radicals such as phenyl and p-tolyl. As an example of an alkylene radical which may be formed by $R^8$ and $R^{10}$ together there may be mentioned ethylene. In this case an imidazoline ring is formed.

As hydrazinium groups there are meant groups of the formula $N^+R^{12}R^{13}$—$NR^{14}R^{15}$ wherein $R^{12}$ represents an optionally substituted alkyl, cycloalkyl, aralkyl or phenyl radical or together with $R^{13}$ and the adjacent nitrogen atom a heterocyclic system.

$R^{13}$ represents an optionally substituted alkyl, cycloalkyl aralkyl or phenyl radical or together with $R^{12}$ and the adjacent nitrogen atom a heterocyclic system.

$R^{14}$ represents a hydrogen atom or an optionally substituted alkyl radical or an acyl radical which may form a ring with $R^{15}$ and N or when $R^{12}$ and $R^{13}$ are other than phenyl, a phenyl radical.

$R^{15}$ represents a hydrogen atom or an optionally substituted alkyl radical or an acyl radical.

As phosphonium groups there are meant groups of the formula

wherein $R^{16}$, $R^{17}$ and $R^{18}$ are organic radicals, which may be the same or different, each having a carbon atom linked directly to the phosphorus atom. As examples of organic radicals which may be represented by $R^{16}$, $R^{17}$ and $R^{18}$ there may be mentioned aliphatic radicals, for example methyl, ethyl, propyl, butyl, alllyl, chloromethyl, hydroxymethyl and δ-hydroxymethyl, aromatic radicals, for example, phenyl, naphthyl, p-chlorophenyl, aralkyl radicals, for example benzyl and heterocyclic radicals, for example -2-thienyl.

The cationic group $K^+$ is preferably a cyclammonium or quaternary ammonium group especially a cyclammonium group which is an optionally ring methyl substituted pyridinium group.

The anion $X^-$ may be any anion of an inorganic or organic acid capable of forming a salt with a quaternary nitrogen cation.

Examples of the anion $X^-$ include inorganic anions such as chloride, bromide, iodide, tetrachlorozincate, bisulphate, nitrate, sulphate, sulphamate, phosphate, borate, tetrafluoroborate, perchlorate, phosphomolybdate and organic ions such as acetate, propionate, oxalate, moleate, lactate, succinate, chloroacetate, benzoate, methyl sulphate, p-tolyl sulphonate and methane sulphonate. In the cases where the anion is polyvalent the dyestuff will contain a corresponding polar proportion of the cationic part of the dyestuff.

The ring A may carry additional substituents or have a benz ring fused thereon.

Examples of additional substituents which may be present in the ring A include halogen atoms for example chloro, bromo and fluoro, alkoxy for example methoxy and ethoxy, alkyl for example methyl, acylamino for example acetylamino, alkoxycarbonyl for example methoxycarbonyl, nitro, acyloxy for example acetoxy, aryloxy for example phenoxy, carbamyl for example diethylaminocarbonyl, amino for example methylamino, alkylsulphonyl, phenoxy sulphonyl, trifluoromethyl, alkoxycarbonylamino, dialkylaminosulphamyl, monoalkylaminosulphamyl, sulphamyl, acyl for example acetyl, cyano, arylazo, aryl for example phenyl, substituted aryl for example 4[2'-hydroxy-3-pyridinium-4'-methylpyrid-6'-one-5'-ylazo]-3-alkoxycarbonylphenyl.

A benz ring may be fused on to the ring A in the 3,4; 4,5 or 5,6 positions relative to the azo group as 1 but this will clearly depend on the position of Y.

Particularly valuable classes of dyestuffs are those of formula (I) wherein Y contains a hydrocarbyl radical of more than five carbon atoms preferably 6 to 16 carbon atoms, R is a lower alkyl group of 1 to 4 carbon atoms especially methyl, $R^1$ is hydrogen or lower alkyl of 1–4 carbon atoms especially methyl and $K^+$ is a cyclammonium or quaternary ammonium group especially an optionally ring alkyl substituted pyridinium group.

As a further feature of the present invention there is provided a process for the manufacture of the dyestuffs of the invention which comprises diazotising an aromatic amine of the formula

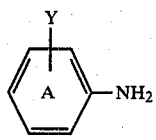

and coupling the diazonium salt with a pyridone of the formula

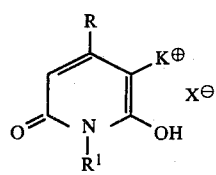

wherein A, Y, R, R¹, K⁺ and X⁻ are as hereinbefore defined.

The diazotisation and coupling steps of the process may be carried out in conventional manner, for example by mixing a solution of the diazotised amine, obtained in known manner, with an aqueous solution of the coupling component.

Examples of aromatic amines which may be used as the diazo component include
4-propionylaniline
4-butyrylaniline
4-valerylaniline
4-caproylaniline
4-palamitylaniline
4-(N-butyl-N-phenylcarbamyl)aniline
4-(N-(2'-ethylhexyl)carbamyl)aniline
4-(N,N-dibutylcarbamyl)aniline
4-(N-hexyl-B-phenylcarbamyl)aniline
4-(N-nonyl-N-phenylcarbamyl)aniline
4-caprylylaniline
4-caprylaniline
4-laurylaniline
4-myristylaniline
4-stearylaniline Examples of pyridone coupling components which may be used include:
2-keto-3-pyridinium chloride-4-methyl-6-hydroxy-1,2-dihydropyridine,
1,2'-4-trimethyl-2-keto-3-pyridinium chloride-6-hydroxy-1,2-dihydropyridine,
1-(3''-methoxy)-n-propyl-2-keto-3-(2'-chloro)-pyridinium chloride-4-methyl-6-hydroxy-1,2-dihydropyridine,
1-n-butyl-2-keto-3-(4'-ethyl)-pyridinium chloride-4-methyl-6-hydroxy-1,2-pyridine,
1-(2''-ethyl-hexyl-2-keto-3-(3'-cyano)-pyridinium chloride-4-methyl-6-hydroxy-1,2-dihydropyridine,
1-(2''-hydroxy)-ethyl-2-keto-3-(2'-methoxy)-pyridinium chloride-4-methyl-6-hydroxy-1,2-dihydropyridine,
1-(2''-N'''-methylpiperazinyl)-ethyl- 2-keto-3-(2'-methyl)-pyridinium chloride-4-ethoxycarbonyl-6-hydroxy-1,2-dihydropyridine,
1-(2''-hydroxyethylamino)-ethyl-2-keto-3-(3'-methyl)-pyridinium chloride-4-methyl-6-hydroxy-1,2-dihydropyridine,
1-(2''-ethyl)-hexyl-2-keto-3-quinolinium chloride-4-methyl-6-hydroxy-1,2-pyridine,
1-methyl-2-keto-3-isoquinolinium chloride-4-methyl-6-hydroxy-1,2-dihydropyridine,
1-phenyl-2-keto-3-pyridinium chloride-4-methyl-6-hydroxy-1,2-dihydropyridine,
1-(2''-chloro)-phenyl-2-keto-3-pyridinium chloride-4-methyl-6-hydroxy-1,2-dihydropyridine,
1-(3''-methyl)-phenyl-2-keto-3(2'-methyl)-pyridinium chloride-4-methyl-6-hydroxy-1,2-dihydropyridine,
1-dimethylamino-2-keto-3-β-pyridinium chloride-4-methyl-6-hydroxy-1,2-dihydropyridine,
1-amino-2-keto-3-pyridinium chloride-4-methyl-6-hydroxy-1,2-dihydropyridine,
1-pyrrolidinyl-2-keto-3-pyridinium chloride-4-methyl-6-hydroxy-1,2-dihydropyridine,
1-(N-methyl)-piperazinyl-2-keto-3-pyridinium chloride-4-methyl-6-hydroxy-1,2-dihydropyridine,
1-morpholinyl-2-keto-3-pyridinium chloride-4-methyl-6-hydroxy-1,2-dihydropyridine,
1-(4'-dimethylamino)-phenyl-2-keto-3(2''-methyl)-pyridinium chloride-4-methyl-6-hydroxy-1,2-dihydropyridine,
1-amino-2-keto-3-pyridinium chloride-4-ethoxycarbonyl-6-hydroxy-1,2-dihydropyridine,
1-dimethylamino-2-keto-3-pyridinium chloride-4-phenyl-6-hydroxy-1,2-dihydropyridine,
1-(3'-dibutylamino)-n-propyl-2-keto-3-pyridinium chloride-4-methyl-6-hydroxy-1,2-dihydropyridine,
1-(2'-diethylamino)-ethyl-2-keto-3-pyridinium chloride-4-methyl-6-hydroxy-1,2-dihydropyridine,
1-(2'-hydroxyethylamino)-ethyl-2-keto-3-pyridinium chloride-4-methyl-6-hydroxy-1,2-dihydropyridine,
1-[2'-(2''-hydroxyethoxy)-ethylamino]-2-keto-3-pyridinium chloride-4-methyl-6-hydroxy-1,2-dihydropyridine,
1-(2'-morpholinyl)-ethyl-2-keto-3-pyridinium chloride-4-methyl-6-hydroxy-1,2-dihydropyridine,
1-(2'-N-methylpiperazinyl)-ethyl-2-keto-3-pyridinium chloride-4-methyl-6-hydroxy-1,2-dihydropyridine,
2-keto-3-pyridinium chloride-4-ethoxycarbonyl-6-hydroxy-1,2-dihydropyridine,
2-keto-3-pyridinium chloride-4-N'',N'''-dimethylcarbamoyl-6-hydroxy-1,2-dihydropyridine,
2-keto-3-pyridinium chloride-4-phenyl-6-hydroxy-1,2-dihydropyridine,
1-ethyl-2-keto-3-pyridinium chloride-4-methyl-6-hydroxy-1,2-dihydropyridine,
1-methyl-2-keto-3-trimethylammonium chloride-4-methyl-6-hydroxy-1,2-dihydropyridine,
2-keto-3-dimethylbenzylammonium chloride-4-methyl-6-hydroxy-1,2-dihydropyridine,
1-ethyl-2-keto-3-[N-methyl-1-piperidinium chloride]-4-methyl-6-hydroxy-1,2-dihydropyridine,
2-keto-3-[N-methyl-1'-pyrrolidinium chloride]-4-methyl-6-hydroxy-1,2-dihydropyridine,
2-keto-3-[N-methyl-1'-morpholinium chloride]-4-methyl-6-hydroxy-1,2-dihydropyridine,
2-keto-3-dimethylsulphonium chloride-4-ethyl-6-hydroxy-1,2-dihydropyridine,
2-keto-3-dimethylhydrazinium chloride-4-methyl-6-hydroxy-1,2-dihydropyridine,
2-keto-3-trimethylphosphonium chloride-4-methyl-5-hydroxy-1,2-dihydropyridine.

An anion present in a dyestuff of the invention may be replaced by a different anion by known methods, for example, by metathesis.

An alternative method of producing the dyestuffs of the invention is by diazotising an amine of the formula

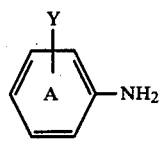

and coupling the diazo compound with an acyl acetic ester for example ethyl acetoacetate by known methods and then reacting the product with a salt of an acetic acid amide containing a group, in the presence of a catalyst and a solvent such as methanol.

The dyestuffs of the invention are valuable for the colouration of synthetic polymeric materials by application from an aqueous bath. The dyestuffs have a rapid rate of dyeing and may therefore be advantageously used in admixture with known commerical dyestuffs. The present dyestuffs give valuable bright shades of high tinctorial strength.

In particular the dyestuffs of the invention are valuable for colouring polyacrylonitrile materials and may be applied thereto from acid, neutral or slightly alkaline dyebaths (i.e. pH from 3-8) at temperatures between, for example, 40° C. and 120° C., preferably between 80° C. and 120° C. or by printing techniques using thickened printing pastes. Bright yellow to orange dyeings of excellent fastness properties to washing, perspiration, steam-pleating and light are obtained.

The preferred dyestuffs of the invention, that is those dyestuffs in which Y contains a hydrocarbyl group of more than 5 carbon atoms, possess a further advantage in that they have compatibility values in the range 2.5 to 3.5, i.e. about 3 as assessed by the method for the determination of compatibility values described in the Journal of the Society of Dyers and Colourists, Volume 87, No. 2, page 60 (1971). Compatibility is assessed on a scale of 1 to 5 and dyers engaged in the dyeing of polyacrylonitrile materials show a strong preference for dyestuffs having a compatibility value or C.V. value as it is known, of 2.5 to 3.5. Additionally, dyestuffs of C.V. 2.5 to 3.5 are compatible in dyeing properties with the large majority of mainstream commercial dyes used in the dyeing of polyacrylonitrile.

The dyestuffs of the invention may also be applied by wet transfer printing processes for example those in which a support, such as paper, is printed with an ink containing the dyestuff, the printed support placed in contact with a textile material and the whole then subjected to heat and pressure under wet/humid conditions to transfer the dyestuff to the textile material.

The invention is illustrated by the following examples in which all parts and percentages are by weight except where otherwise indicated.

EXAMPLE 1

2.68 parts of 4-(N-butyl-N-phenylcarbamyl)aniline is stirred with 10 parts of glacial acetic acid and 2.5 parts of concentrated hydrochloric acid. 5 parts of 2 N sodium nitrite are then added whilst maintaining the temperature at 0°-5° C. and the mixture is then stirred at 0°-5° C. for ½ hour. Excess of nitrous acid is removed by the addition of a few drops of 20% sulphamic acid solution. A solution of 2.4 parts of 2-keto-3-pyridinium chloride-4-methyl-6-hydroxy-1,2-dihydropyridine in 75 parts of water is stirred at 0°-5° C. and the above diazo solution is then added over 10 minutes. After stirring 1 hour at room temperature, salt is added to 5% weight-/volume and the mixture is then stirred for 15 min. The bright yellow solid is filtered off and washed with 25 parts of 5% brine then dried at 60° C. to yield an orange powder which dyes polyacrylonitrile and acrylonitrile co-polymers in vivid yellow shades of excellent fastness to light and washing and has the structure (I).

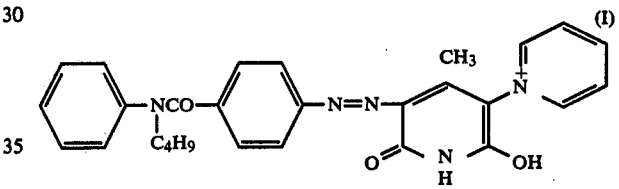

Further dyestuffs dyeing polyacrylonitrile in yellow shades are obtained by similar methods and are described in the following table. The first column shows the diazo component $DNH_2$, the second column the substituent $R^1$, the third column $K^+$ and the fourth column the anion $X^-$.

The general formula of the dyestuffs is given below:

| Ex. | $DNH_2$ | $R^1$ | $K^+$ | $X^-$ |
|---|---|---|---|---|
| 2 | 4-propionylaniline | H | (pyridinium) | $Cl^\ominus$ |
| 3 | 4-palmitylaniline | $C_2H_5$ | " | " |
| 4 | " | H | " | " |
| 5 | 4-[N-(2'-ethylhexyl)carbamyl]aniline | H | " | $\frac{1}{2}SO_4^{2-}$ |
| 6 | " | H | (4-methylpyridinium) | $Cl^-$ |
| 7 | 4-(N-nonyl-N-phenylcarbamyl)aniline | $CH_3$ | " | $CH_3COO^-$ |

-continued

| | | $CH_3$ | | |
|---|---|---|---|---|
| | | D—N=N / K+ X− | | |
| | | HO / N / O | | |
| | | R¹ | | |
| Ex. | $DNH_2$ | R¹ | K+ | X− |
| 8 | " | H | pyridine | $Cl^-$ |

Further dyes of the general formula shown below are obtained by similar methods to that given in Example 1. The first column describes the diazo component $DNH_2$, the second column the substituent R, the third column the substituent $R^1$, the fourth column $K^{\oplus}$ and the fifth column the anion $X^{\ominus}$ and the final column describes the shade imparted to acrylic fibres by the dyestuffs.

$$D-N=N-\text{ring with R, } K^{\oplus}, X^{\ominus}, O, N-R^1, OH$$

| Ex. | $DNH_2$ | R | $R^1$ | $K^{\oplus}$ | $X^{\ominus}$ | Shade imparted to acrylic fibres |
|---|---|---|---|---|---|---|
| 9 | 4-caprylaniline | $CH_3$— | H | pyridinium | $Cl^{\ominus}$ | greenish-yellow |
| 10 | " | $ClCH_2$— | " | " | " | " |
| 11 | " | $C_6H_5$ | " | " | " | " |
| 12 | 4-stearylaniline | $CH_3$ | $CH_3$ | γ-picolinium | $\frac{1}{2}SO_4^{2-}$ | " |
| 13 | 4-(N-butyl-N-phenyl-carbamyl)aniline | " | " | " | " | " |
| 14 | 2-(N-butyl-N-phenyl-carbamyl)-4-methyl-aniline | " | H | pyridinium | $Cl^{\ominus}$ | mid-yellow |
| 15 | 4-(N-butyl-N-phenyl-carbamyl)-2-chloro-aniline | " | " | " | " | greenish-yellow |
| 16 | " | " | $NH_2$ | α-picolinium | " | " |
| 17 | 2-(N-butyl-N-phenyl-carbamyl)-2-methoxy-aniline | " | H | " | " | reddish-yellow |
| 18 | 4-palmitylaniline | " | $NH_2$ | pyridinium | " | mid-yellow |
| 19 | 4-laurylaniline | " | " | " | " | " |
| 20 | 4-lauryl-2-chloro-aniline | " | H | " | " | greenish-yellow |
| 21 | " | " | " | γ-picolinium | " | " |
| 22 | 4-[N-(2'-ethylhexyl)-carbamyl]aniline | " | $CH_3$ | " | " | " |
| 23 | " | " | $nC_4H_9$ | pyridinium | $SO_2NH_2^{\ominus}$ | " |
| 24 | " | " | $CH_2CHnC_4H_9$ \| $CH_2CH_3$ | " | " | " |
| 25 | 2-[N-(2'-ethylhexyl)-carbamyl]4-methoxy-aniline | " | " | " | $Cl^{\ominus}$ | reddish-yellow |
| 26 | 4-(N-nonyl-N-phenyl-carbamyl)aniline | " | H | " | " | greenish-yellow |
| 27 | " | " | $NH_2$ | β-picolinium | " | " |
| 28 | 4-caproylaniline | " | $C_6H_5$ | pyridinium | " | " |
| 29 | 2-caproyl-4-methyl-aniline | " | " | " | " | mid-yellow |
| 30 | 4-(N-dodecylcarbamyl)-aniline | " | H | " | $\frac{1}{2}SO_4^{2-}$ | greenish-yellow |
| 31 | 2-(N-dodecylcarbamyl)-4-chloroaniline | " | " | " | " | " |
| 32 | 2-palmityl-4-methoxy-carbonylaniline | " | $CH_3$ | " | " | reddish-yellow |
| 33 | 4-(N-methyl-N-dodecyl-carbamyl)aniline | " | " | " | " | greenish-yellow |
| 34 | 2-(N-methyl-N-dodecyl-carbamyl)-4-methoxy-aniline | " | " | " | " | reddish-yellow |
| 35 | 2-(N-methyl-N-dodecyl-carbamyl)-4-chloro- | " | " | α-picolinium | $Cl^{\ominus}$ | mid-yellow |

-continued

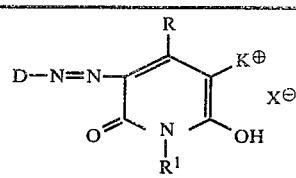

| Ex. | DNH₂ | R | R¹ | K⊕ | X⊖ | Shade imparted to acrylic fibres |
|---|---|---|---|---|---|---|
| 36 | aniline | " | " | pyridinium | " | " |
| 37 | 2-methoxy-4-palmityl-aniline | " | H | α-picolinium | SONH₂⊖ | " |
| 38 | 3-(N-methyl-N-dodecyl-carbamyl)aniline | " | " | " | " | greenish-yellow |
| 39 | 2-chloro-4-caprylyl-aniline | " | " | β-picolinium | Cl⊖ | " |
| 40 | 2,5-bis(N-dodecyl-carbamyl)aniline | " | CH₃ | pyridinium | " | " |
| 41 | 2-methoxycarbonyl-4-palmitylaniline | C₆H₅ | C₂H₅ | " | Br⊖ | " |
| 42 | " | CH₃ | H | γ-picolinium | ½SO₄²⁻ | " |
| 43 | 2-methoxy-4-aminoazo-benene | " | CH₃ | pyridinium | Cl⊖ | reddish-yellow |
| 44 | 4-N(dodecylcarbamyl)-aniline | " | NH₂ | " | " | greenish-yellow |
| 45 | " | " | C₆H₅ | γ-picolinium | CH₃COO⊖ | " |
| 46 | 2,5-bis[N-(2'-ethyl-hexyl)carbamyl]aniline | " | H | " | Cl⊖ | " |
| 47 | 4-palmityaniline | " | " | pyridinium | " | " |
| 48 | 4-caprylaniline | " | " | " | " | " |
| 49 | 4-caproylaniline | " | " | " | " | " |
| 50 | 4-palmitylaniline | ClCH₂ | " | " | ½SO₄²⁻ | " |
| 51 | 4-(N-dodecylcarbamyl)-aniline | " | " | " | Cl⊖ | " |
| 52 | " | C₆H₅ | " | " | " | " |
| 53 | 3-[N-(2'-ethylhexyl)-carbamyl]aniline | CH₃ | CH₃ | γ-picolinium | CH₃COO⊖ | " |
| 54 | " | " | H | " | Cl⊖ | " |
| 55 | " | C₆H₅ | CH₃ | pyridinium | " | " |
| 56 | 3-(N-nonyl-N-phenyl-carbamyl)aniline | CH₃ | H | " | SO₂NH₂⊖ | " |
| 57 | " | CH₂Cl | CH₃ | " | Cl⊖ | " |
| 58 | " | C₆H₅ | H | " | " | " |
| 59 | " | CH₃ | nC₄H₉ | " | CH₃COO⊖ | " |
| 60 | 4-caproylaniline | C₆H₅ | H | " | ½SO₄²⁻ | " |
| 61 | " | CH₃ | C₄H₉ | " | Cl⊖ | " |
| 62 | " | " | β-pyridyl | " | " | " |
| 63 | " | " | CH₂CHnC₄H₉<br>\|<br>CH₃ | " | " | " |
| 64 | 3-(N-butyl-N-phenyl-carbamyl)aniline | " | C₄H₉ | α-picolinium | HSO₄⊖ | " |
| 65 | 4-caprylaniline | " | CH₃ | γ-picolinium | Cl⊖ | " |
| 66 | 4-palmitylaniline | " | " | pyridinium | " | " |
| 67 | 3-(N-butyl-N-phenyl-carbamyl)aniline | " | H | γ-picolinium | CH₃COO⊖ | " |

EXAMPLE 68

4.10 Parts of 4,4'-diamino-3,3'-n-valeryldiphenylurea is stirred with 20 parts of glacial acetic acid and 5.0 parts of concentrated hydrochloric acid, then treated in the same way as described in Example 1 with sodium nitrite followed by sulphamic acid and 2-keto-3-pyridinium chloride-4-methyl-6-hydroxy-1,2-dihydropyridone. The final dyestuff has the structure

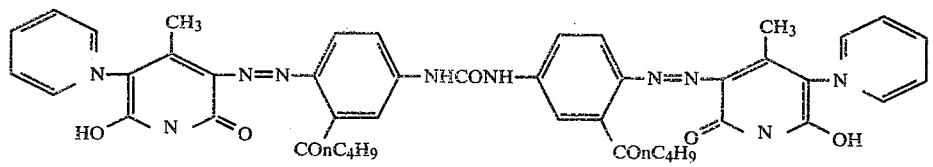

and dyes polyacrylonitrile and acrylonitrile copolymers in vivid orange shades of good fastness to light and washing.

We claim:
1. Azo dyestuffs devoid of carboxylic acid and sulphonic acid groups and of the formula (I)

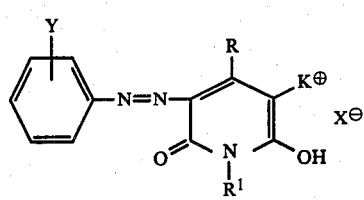
wherein R is methyl, $R^1$ is hydrogen or methyl, Y is a group $-COR^2$ wherein $R^2$ is an alkyl group having 7 to 16 carbon atoms, $K^+$ is an optionally methyl substituted pyridinium group and $X^-$ is an anion.
2. Azo dyestuffs as claimed in claim 1 wherein Y is in the para-position relative to the azo group.
* * * * *